(12) United States Patent
Aoyagi et al.

(10) Patent No.: US 6,875,531 B2
(45) Date of Patent: Apr. 5, 2005

(54) FUEL CELL POWER SUPPLY DEVICE

(75) Inventors: Satoshi Aoyagi, Wako (JP); Hibiki Saeki, Wako (JP); Yusuke Hasegawa, Wako (JP); Kazuo Kotaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 512 days.

(21) Appl. No.: 10/143,292

(22) Filed: May 10, 2002

(65) Prior Publication Data

US 2002/0192518 A1 Dec. 19, 2002

(30) Foreign Application Priority Data

May 10, 2001 (JP) ........................................ 2001-139934
May 7, 2002 (JP) ........................................ 2002-132000

(51) Int. Cl.$^7$ ............................................... H01M 8/04
(52) U.S. Cl. ............................ 429/23; 429/19; 429/21; 429/22; 429/25; 180/65.3
(58) Field of Search ............................. 429/22, 23, 25, 429/19, 21; 180/65.3

(56) References Cited

U.S. PATENT DOCUMENTS

| | | | | |
|---|---|---|---|---|
| 5,631,532 A | * | 5/1997 | Azuma et al. ............... | 320/102 |
| 6,342,316 B1 | * | 1/2002 | Okamoto et al. ............. | 429/19 |
| 6,387,556 B1 | * | 5/2002 | Fuglevand et al. ............. | 429/22 |
| 6,684,135 B2 | * | 1/2004 | Uenodai et al. ............... | 701/22 |
| 6,691,810 B2 | * | 2/2004 | Hasuka et al. .............. | 180/65.3 |

* cited by examiner

Primary Examiner—Bruce F. Bell
(74) Attorney, Agent, or Firm—Anthony A. Laurentano; Lahive & Cockfield, LLP

(57) ABSTRACT

A power supply management control unit 14 has a requested-amount-of-generated-electric-energy calculator 51 for calculating a requested amount of electric energy (Ifc_CAL) generated by a fuel cell stack 2 depending on a requested electric energy of an electric motor and an electric load other than the electric motor, an actual-amount-of-generated-electric-energy calculator 52 for calculating an actual amount of electric energy (Ifc_s) generated by the fuel cell stack 2 based on a current (Ifc) detected by a fuel cell sensor 30, and a target selector 53 for comparing the requested amount of electric energy (Ifc_CAL) and the actual amount of electric energy (Ifc_s) with each other, regarding the requested amount of electric energy (Ifc_CAL) as a target amount of generated electric energy (Ifc_REQ) for a fuel cell control unit 16 if the requested amount of electric energy (Ifc_CAL) is equal to or greater than the actual amount of electric energy (Ifc_s), and regarding the actual amount of electric energy (Ifc_s) as target amount of generated electric energy (Ifc_REQ) for the fuel cell control unit 16 if the actual amount of electric energy (Ifc_s) greater than the requested amount of electric energy (Ifc_CAL).

2 Claims, 3 Drawing Sheets

FUEL CELL POWER SUPPLY DEVICE

BACKGROUND OF THE INVENTION

1. Field of the Invention

The present invention relates to a fuel cell power supply device for controlling the amount of reactive gases supplied to a fuel cell depending on the electric energy requested by a load on the fuel cell.

2. Description of the Related Art

There have heretofore been employed fuel cell power supply devices which use fuel cells as a power supply device for vehicles such as electric vehicles. The amount of electric energy generated by a fuel cell varies depending on the amount of reactive gases consumed thereby, i.e., a reducing gas such as hydrogen or the like and an oxidizing gas such as air or the like for extracting electrons by reacting with the reducing gas. Therefore, if the supplied amount of the reactive gases is larger than the consumed amount of the reactive gases which is required to produce an amount of electric energy depending on the amount of electric energy requested by a load such as an electric motor or the like on the fuel cell, then a certain amount of the reactive gases is wasted.

If the actually supplied amount of the reactive gases is smaller than the consumed amount of the reactive gases which is required to produce an amount of electric energy depending on the requested amount of electric energy, then the fuel cell runs short of the reactive gases, and the electrolytic membrane of the fuel cell is deteriorated, resulting in a reduction in the performance of the fuel cell.

One conventional fuel cell power supply device incorporates a control arrangement shown in FIG. 3 of the accompanying drawings for determining a target amount of generated electric energy (Ifc_CMD) for a fuel cell on a vehicle. When electric energy starts being supplied from the fuel cell to an electric motor, a requested-amount-of-electric-energy calculator 100 determines a requested amount of generated electric energy (Ifc_CAL) required by the fuel cell depending on the amount of depression (Ap) of the accelerator pedal, the vehicle speed (Nm) of the vehicle, and the consumed amount of electric energy (Pload) used by electric accessories other than the electric motor.

While electric energy is being supplied to the electric motor, an actual amount of electric energy (Ifc) generated by the fuel cell is detected, and a subtractor 101 calculates the difference between the actual amount of generated electric energy (Ifc) and the requested amount of generated electric energy (Ifc_CAL). The calculated difference is processed according to a PID control process by a PID controller 102, which produces a corrective quantity (Ifc_AMD). An adder 103 adds the corrective quantity (Ifc_AMD) to the requested amount of generated electric energy (Ifc_CAL), thus calculating a target amount of generated electric energy (Ifc_CMD). The supply of reactive gases to the fuel gas is controlled such that the reactive gases are supplied to the fuel cell in an amount depending on the target amount of generated electric energy (Ifc_CMD).

By thus correcting the requested amount of generated electric energy (Ifc_CAL) depending on the difference between the actual amount of generated electric energy (Ifc) and the requested amount of generated electric energy (Ifc_CAL) to calculate the target amount of generated electric energy (Ifc_CMD), the effect of variations of the electric energy consumed by the electric motor and the electric accessories is suppressed to stabilize the target amount of generated electric energy (Ifc_CMD).

The control arrangement shown in FIG. 3 for calculating the target amount of generated electric energy (Ifc_CMD) and controlling the amount of the reactive gases supplied to the fuel cell in an amount depending on the target amount of generated electric energy (Ifc_CMD) suffers the following problems: When the load on the fuel cell increases abruptly, the PID controller 102 and the adder 103 perform a corrective action to prevent the target amount of generated electric energy (Ifc_CMD) from increasing. As a result, the transient response of the fuel cell is lowered, causing the fuel cell to suffer a lack of the reactive gases.

SUMMARY OF THE INVENTION

It is an object of the present invention to provide a fuel cell power supply device which prevents a fuel cell from running short of reactive gases when the amount of reactive gases supplied to the fuel cell is controlled depending on a requested electric energy of a load on the fuel cell.

According to the present invention, there is provided a fuel cell power supply device comprising a fuel cell, reactive gas supply means for supplying reactive gases to the fuel cell, supplied-amount regulating means for regulating an amount of reactive gases supplied from the reactive gas supply means to the fuel cell, target-amount-of-generated-electric-energy determining means for determining a target amount of electric energy generated by the fuel cell depending on a requested electric energy of a load which is connected to the fuel cell, and gas supply control means for performing a gas supply control process to enable the supplied-amount regulating means to regulate the amount of reactive gases supplied from the reactive gas supply means to the fuel cell in order to supply an amount of reactive gases greater than the amount of reactive gases depending on the target amount of electric energy.

The fuel cell power supply device includes actual-amount-of-electric-energy detecting means for detecting an actual amount of electric energy generated by the fuel cell, and the gas supply control means comprises means for comparing the target amount of electric energy and the actual amount of electric energy with each other, and performing the gas supply control process using the actual amount of electric energy as the target amount of electric energy if actual amount of electric energy is greater than the target amount of electric energy.

With the above arrangement, the gas supply control means basically performs the gas supply control process to supply the target amount of reactive gases set depending on the target amount of generated electric energy determined by the target-amount-of-generated-electric-energy determining means, thus preventing the reactive gases from being supplied excessively or insufficiently.

When the load increases quickly, the requested electric energy changes due to the increased load, and the actual amount of electric energy generated by the fuel cell may become greater than the target amount of generated electric energy due to a time lag until the target amount of generated electric energy is changed by the target-amount-of-generated-electric-energy determining means depending on the change in the requested electric energy.

The gas supply control means compares the target amount of electric energy determined by the target-amount-of-generated-electric-energy determining means and the actual amount of electric energy with each other while the gas supply control process is being carried out, and performs the gas supply control process using the actual amount of electric energy as the target amount of electric energy if actual amount of electric energy is greater than the target amount of electric energy. The amount of reactive gases supplied to the fuel cell is thus quickly increased, preventing the fuel cell from running short of reactive gases.

The fuel cell power supply device also has electric storage means connected parallel to the fuel cell, for being charged with an output current from the fuel cell and discharged when the amount of electric energy generated by the fuel cell is smaller than the requested electric energy.

If the load is reduced and the requested electric energy thereof is also reduced, then the target amount of electric energy determined by the target-amount-of-generated-electric-energy determining means is reduced, thus reducing the reactive gases supplied to the fuel cell according to the gas supply control process.

When the amount of electric energy generated by the fuel cell is reduced, the output voltage of the fuel cell is increased. However, since the electric storage means is connected parallel to the fuel cell, in order to increase the output voltage of the fuel cell, it is necessary to supply a charging current from the fuel cell to the electric storage means to charge the electric storage means for thereby increasing the output voltage of the fuel cell. While the target amount of generated electric energy is being reduced, therefore, it is necessary to supply electric energy to the electric storage means as well as the load. If the target amount of generated electric energy is determined depending on the requested electric energy of the load, the amount of reactive gases supplied to the fuel cell may tend to suffer a shortage commensurate with the charging current supplied to the electric storage means.

According to the present invention, therefore, when the actual amount of generated electric energy which contains the amount of current used to charge the electric storage means becomes greater than the target amount of generated electric energy, the gas supply control process is performed using the actual amount of generated electric energy as the target amount of generated electric energy, so that the gas supply control means can prevent the fuel cell from running short of reactive gases.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

A fuel cell power supply device according to the present invention will be described below with reference to FIGS. 1 and 2.

Figure 1:
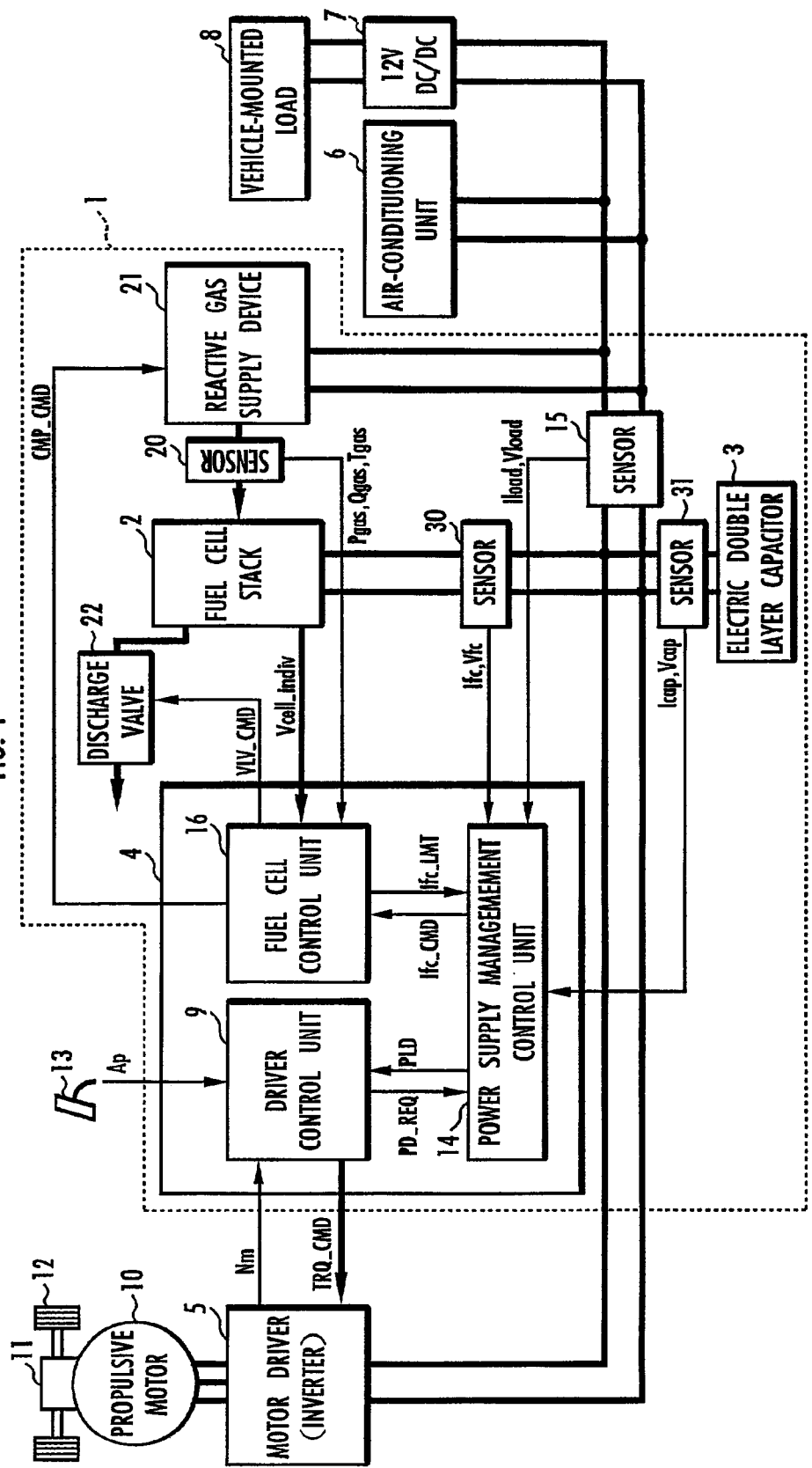
FIG. 1 is a block diagram of a fuel cell power supply device according to the present invention.
Figure 2:
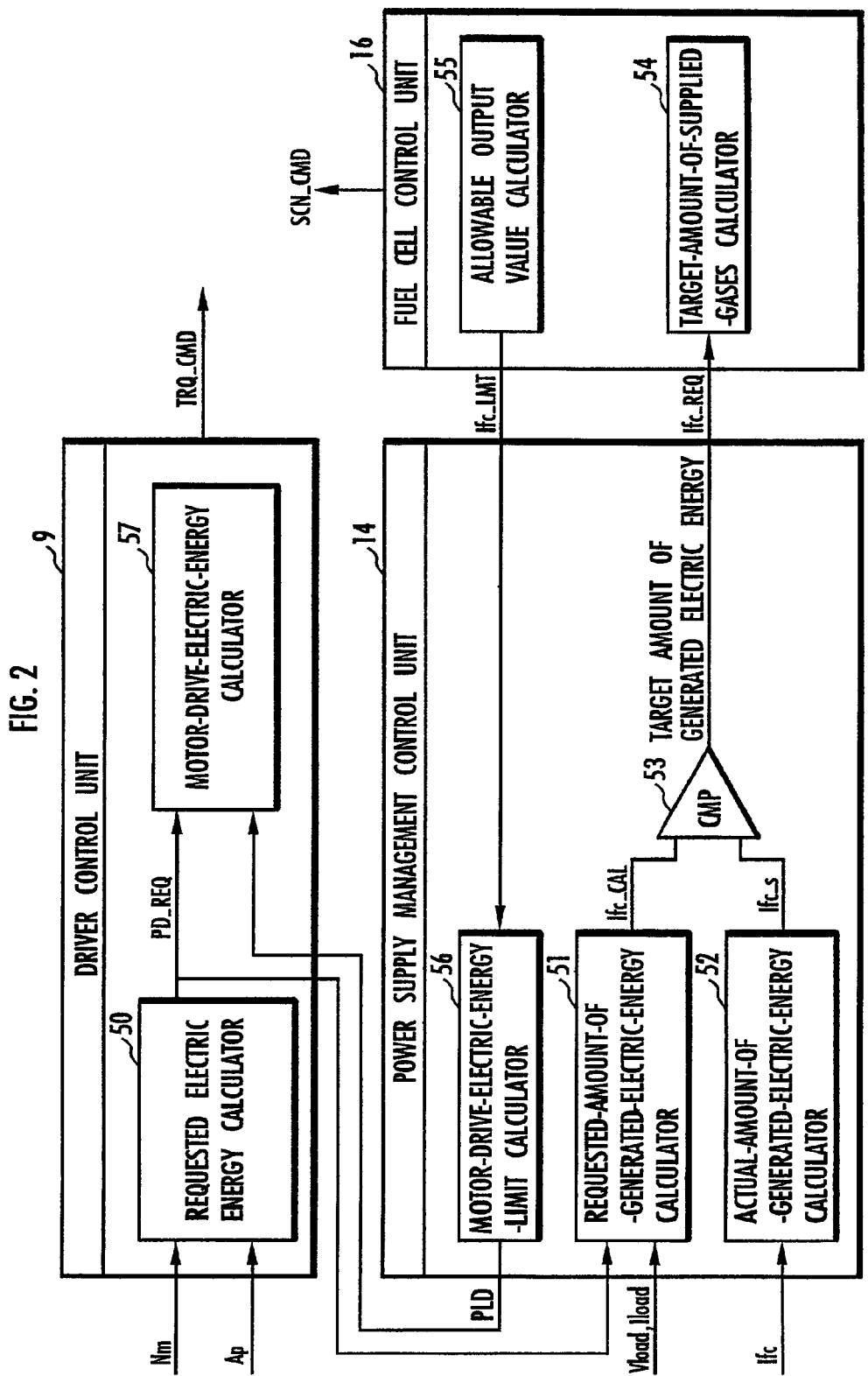
FIG. 2 is a detailed block diagram of a controller of the fuel cell power supply device shown in FIG. 1.
Figure 3:
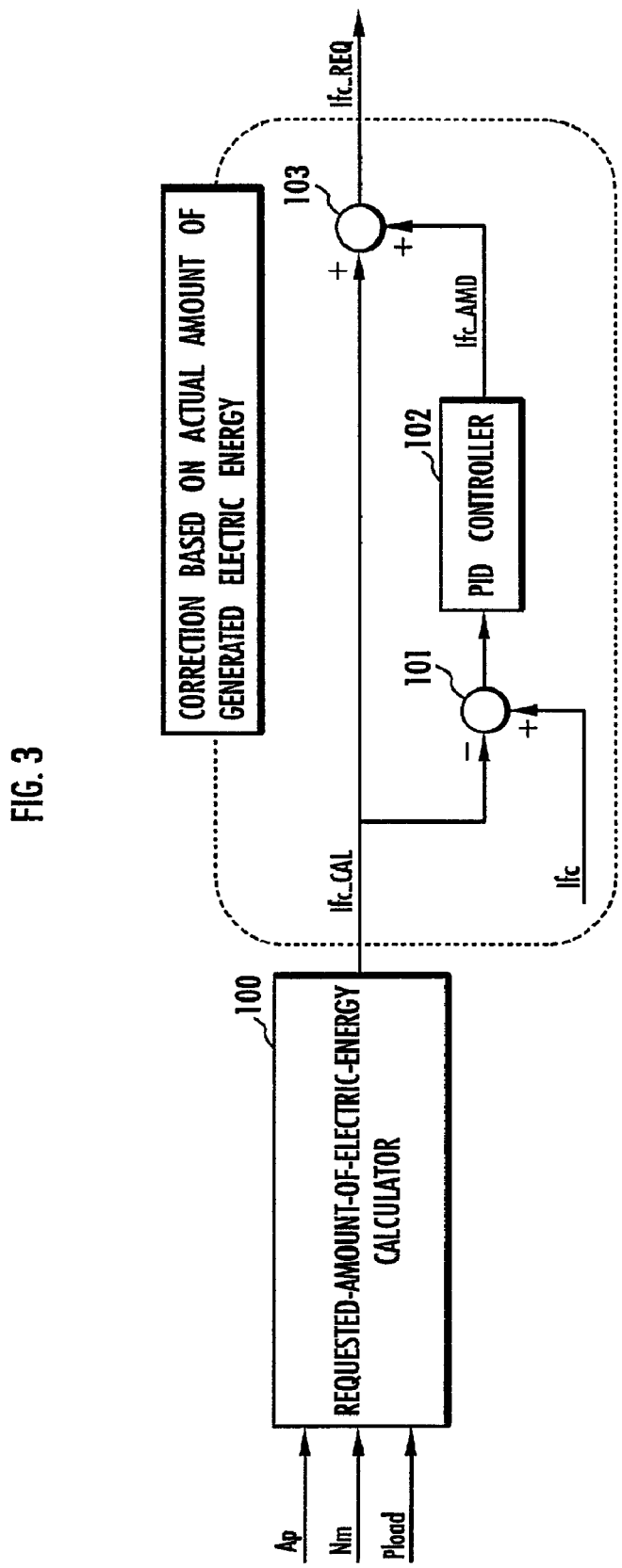
FIG. 3 is a block diagram of a control arrangement of a conventional fuel cell power supply device.

As shown in FIG. 1, a fuel cell power supply device 1 according to the present invention is mounted on a vehicle and functions as a propulsive power supply for the vehicle. The fuel cell power supply device 1 is a hybrid fuel cell power supply device comprising a fuel cell stack 2 for outputting an electric current based on an electro-chemical reaction between reactive gases of hydrogen and air, and an electric double layer capacitor 3 (corresponding to an electric storage means according to the present invention, hereinafter referred to as "capacitor 3") connected parallel to the fuel cell stack 2. The output electric energy produced by the fuel cell power supply device 1 is controlled by a controller 4 which comprises a microcomputer, a memory, and other components. The controller 4 has as its functions a driver control unit 9, a power supply management control unit 14, and a fuel cell control unit 16.

The output electric energy produced by the fuel cell power supply device 1 is supplied to a motor driver 5, an air-conditioning unit 6, and a 12-V vehicle-mounted load 8 through a DC/DC converter. The motor driver 5 control currents flowing through the armatures of an electric motor 10 depending on a torque command value (TRQ_CMD) outputted from the driver control unit 9 of the controller 4. The drive power generated by the electric motor 10 is transferred to drive wheels 12 through a transmission 11.

The driver control unit 9 outputs a signal indicative of a motor-requested electric energy (PD_REQ) which is required by the motor driver 5 based on the amount of depression (Ap) of an accelerator pedal 13 and the rotational speed (Nm) of the electric motor 10, to the power supply management control unit 14 of the controller 4.

The power supply management control unit 14 is supplied with detected signals of a load current (I_load) and a load voltage (V_load) which are detected by a load sensor 15 in order to recognize the electric energy consumed by electric accessories other than the electric motor 10.

The power supply management control unit 14 takes into account an allowable output current (Ifc_LMT) outputted from the fuel cell control unit 16 and indicative of an upper limit for the current that can be supplied from the fuel cell stack 2 and various states (an output voltage and a temperature) of capacitor cells (not shown) of the capacitor 3, determines a target amount of generated electric energy (Ifc_CMD) which is a target value for a current outputted from the fuel cell stack 2 depending on the sum of the motor-requested electric energy (PD_REQ) and the electric energy consumed by the electric accessories other than the electric motor 10, and outputs a signal indicative of the target amount of generated electric energy (Ifc_CMD) to the fuel cell control unit 16. The power supply management control unit 14 also outputs a signal indicative of an output limit electric energy (PLD) representing an upper limit for the electric energy that can be supplied from the fuel cell stack 2, to the driver control unit 9.

The fuel cell control unit 16 is supplied with detected signals outputted from a reactive gas sensor 20 and indicating a pressure (Pgas), a flow rate (Qgas), and a temperature (Tgas) of reactive gases (hydrogen and air) supplied to the fuel cell stack 2, and detected signals indicative of states (Vcell_indiv) of individual fuel cells that make up the fuel cell stack 2. The fuel cell control unit 16 determines the allowable output current (Ifc_LMT) in view of the state of the fuel cell stack 2 as recognized from these detected signals.

The driver control unit 9 outputs a signal indicative of a torque command (TRQ_CMD) to the motor driver 5 so as not to exceed the output limit electric energy (PLD) indicated by the power supply management control unit 14. The motor driver 5 controls the armature currents of the electric motor 10 to cause the electric motor 10 to generate a torque depending on the torque command (TRQ_CMD).

The fuel cell control unit 16 outputs a signal indicative of a target amount of reactive gases (CMP_CMD) supplied to the fuel cell stack 2 to a reactive gas supply device 21 (corresponding to a reactive gas supply means according to the present invention) so that the fuel cell stack 2 will output a current for the target amount of generated electric energy (Ifc_CMD). Based on the target amount of reactive gases (CMP_CMD), the reactive gas supply device 21 supplies air and hydrogen at a rate depending on the target amount of generated electric energy (Ifc_CMD).

The reactive gas supply device 21 has a mechanism (not shown) for regulating the rate at which the reactive gases are supplied. This regulating mechanism corresponds to a supplied-amount regulating means according to the present invention.

Hydrogen supplied from the reactive gas supply device 21 is supplied to hydrogen electrodes of the fuel cell stack 2 through an ejector (not shown) and a humidifier (not shown), and reacts electrically and chemically with oxygen in air supplied to air electrodes of the fuel cell stack 2, producing water which is discharged through a discharge valve 22. The opening of the discharge valve 22 is controlled by a control signal (VLV_LCMD) supplied from the fuel cell control unit 16 in order to keep the pressure in the fuel cell stack 2 at a constant gradient depending on the pressures of the supplied air and hydrogen.

The fuel cell stack 2 has a water-cooled cooling unit (not shown). The fuel cell control unit 16 controls the rate and temperature of cooling water supplied to the water-cooled cooling unit depending on the temperature of the cooling water supplied to the water-cooled cooling unit and the temperature of the cooling water discharged from the water-cooled cooling unit.

The fuel cell power supply device 1 also has a fuel cell sensor 30 (including the function of an actual-amount-of-electric-energy detecting means according to the present invention) for detecting an output current (Ifc) and an output voltage (Vfc) from the fuel cell stack 2, and a capacitor sensor 31 for detecting a current (Icap) charged into and discharged from the capacitor 3 and a voltage (Vcap) across the capacitor 3. Detected signals from the fuel cell sensor 30 and the capacitor sensor 31 are supplied to the power supply management control unit 14.

Details of operation of the power supply management control unit 14, the fuel cell control unit 16, and the driver control unit 9 will be described below with reference to FIG. 2.

The driver control unit 9 has a requested electric energy calculator 50 which calculates a motor-requested electric energy (PD_REQ) based on the amount of depression (Ap) of the accelerator pedal 13 (see FIG. 1) and the rotational speed (Nm) of the electric motor 10 (see FIG. 1) which is outputted from the motor driver 5, and outputs a signal indicative of the calculated motor-requested electric energy (PD_REQ) to the power supply management control unit 14.

The power supply management control unit 14 has a requested-amount-of-generated-electric-energy calculator 51 (corresponding to a target-amount-of-generated-electric-energy determining means according to the present invention) which recognizes an electric energy consumed by the electric accessories other than the electric motor 10 from the detected signals of the load current (I_load) and the load voltage (V_load) which are detected by the load sensor 15, and adds the recognized electric energy and the motor-requested electric energy (PD_REQ) to each other, thus calculating a total electric energy required to energize the electric motor 10 and the electric accessories. The requested-amount-of-generated-electric-energy calculator 51 applies the total electric energy to electric energy/current conversion map data, stored in a memory, representative of the correlation between the output electric power and output current of the fuel cell stack 2, and converts the total electric energy into a current, as the requested amount of generated electric energy (Ifc_CAL) (corresponding to a target amount of generated electric energy according to the present invention), which is a total amount of current required to energize the electric motor 10 and the electric accessories.

The power supply management control unit 14 also has an actual-amount-of-generated-electric-energy calculator 52 which calculates an actual amount of generated electric energy (Ifc_s) which is an amount of current actually outputted from the fuel cell stack 2, based on the output current (Ifc) of the fuel cell stack 2 (see FIG. 1) which is detected by the fuel cell sensor 30.

The power supply management control unit 14 also has a target selector 53 which compares the requested amount of generated electric energy (Ifc_CAL) and the actual amount of generated electric energy (Ifc_s) with each other. If the requested amount of generated electric energy (Ifc_CAL) is equal to or greater than the actual amount of generated electric energy (Ifc_s), then the target selector 53 regards the requested amount of generated electric energy (Ifc_CAL) as the target amount of generated electric energy (Ifc_CMD) for the fuel cell stack 2, and outputs a signal indicative of the target amount of generated electric energy (Ifc_CMD) to the fuel cell control unit 16.

The fuel cell control unit 16 has a target-amount-of-supplied-gases calculator 54 which applies the target amount of generated electric energy (Ifc_CMD) to generated-amount/consumed-amount map data, stored in a memory, representing the correlation between the amount of electric energy (amount of current) generated by the fuel cell stack 2 and the amount of reactive gases consumed by the fuel cell stack 2, and calculates an amount of reactive gases consumed by the fuel cell stack 2 which is required to achieve the target amount of generated electric energy (Ifc_CMD).

In order to prevent the fuel cell stack 2 from suffering a shortage of the reactive gases due to a calculation error of the target amount of generated electric energy (Ifc_CMD) and a response delay of the reactive gas supply device 21, the target-amount-of-supplied-gases calculator 54 determines a target amount of reactive gases (CMP_CMD) with a margin given to the amount of reactive gases consumed by the fuel cell stack 2 when the target amount of generated electric energy (Ifc_CMD) is obtained, depending on the target amount of generated electric energy (Ifc_CMD), and outputs a signal indicative of the determined target amount of reactive gases (CMP_CMD) to the reactive gas supply device 21. In this manner, a gas supply control process is performed to control the operation of the reactive gas supply device 21 in order to supply the reactive gases in the target amount of reactive gases (CMP_CMD) to the fuel cell stack 2.

The target-amount-of-supplied-gases calculator 54 and the target selector 53 jointly make up a gas supply control means according to the present invention.

The fuel cell control unit 16 also has an allowable output value calculator 55 which calculates an allowable output current (Ifc_LMT) and outputs a signal indicative of the calculated allowable output current (Ifc_LMT) to the power supply management control unit 14. The power supply management control unit 14 has a motor-drive-electric-energy-limit calculator 56 which determines an output limit electric energy (PLD) such that the amount of electric energy generated by the fuel cell stack 2 does not exceed the allowable output current (Ifc__LMT), and outputs a signal indicative of the output limit electric energy (PLD) to the driver control unit 9.

The driver control unit 9 has a motor-drive-electric-energy calculator 57 which compares the motor-requested electric energy (PD__REQ) calculated by the requested electric energy calculator 50 and the output limit electric energy (PLD) with each other, and determines a torque command value (TRQ__CMD) outputted to the motor driver 5 such that the electric energy consumed by the electric motor 10 does not exceed the output limit electric energy (PLD).

As described above, the requested amount of generated electric energy (Ifc__CAL) calculated by the requested-amount-of-generated-electric-energy calculator 51 is directly used as the target amount of generated electric energy (Ifc__CMD) for the fuel cell stack 2, and the signal indicative of the target amount of generated electric energy (Ifc__CMD) is outputted to the fuel cell control unit 16 to perform the gas supply control process to determine a torque command value (TRQ__CMD) to be outputted from the drive control unit 9 to the motor driver 5 such that the electric energy consumed by the electric motor 10 does not exceed the output limit electric energy (PLD).

Consequently, the actual amount of electric energy generated by the fuel cell stack 2 is usually kept equal to or smaller than the requested amount of generated electric energy (Ifc__CAL) calculated by the requested-amount-of-generated-electric-energy calculator 51 according to the gas supply control process. However, the electric energy consumed by the electric accessories, such as the air-conditioning unit 6 (see FIG. 1), other than the electric motor 10 is not managed by the power supply management control unit 14. When the electric energy consumed by the electric accessories change, the detected values of the load voltage (Vload) and the load current (Iload) change, requiring a certain time to be taken until the requested amount of generated electric energy (Ifc__CAL) calculated by the requested-amount-of-generated-electric-energy calculator 51 is changed.

Therefore, a certain time lag occurs until the change in the electric energy consumed by the electric accessories is reflected in the requested amount of generated electric energy (Ifc__CAL) and the target amount of reactive gases (CMP__CMD) outputted from the fuel cell control unit 16 is changed.

If the change in the electric energy consumed by the electric accessories is large in excess of the margin of the target amount of reactive gases (CMP__CMD), then the fuel cell stack 2 runs short of reactive gases during the above time lag. When the fuel cell stack 2 suffers a shortage of reactive gases, the electrolytic membrane of the fuel cell stack 2 is deteriorated, resulting in a reduction in the performance of the fuel cell stack 2.

When the electric energy consumed by the electric motor 10 is lowered, the motor-requested electric energy (PD__REQ) is reduced. When the electric energy consumed by the electric accessories is lowered, the load voltage (Vload) and the load current (Iload) are reduced. Therefore, the requested amount of generated electric energy (Ifc__CAL) calculated by the requested-amount-of-generated-electric-energy calculator 51 is reduced. However, since the output voltage of the fuel cell stack 2 becomes higher as the amount of electric energy generated thereby (the output current thereof) is reduced. In order to reduce the amount of electric energy generated by the fuel cell stack 2, it is necessary to charge the capacitor 3 connected parallel to the fuel cell stack 2 to increase the output voltage of the capacitor 3.

When the amount of electric energy consumed by the electric motor 10 and the electric accessories is reduced, if the requested amount of generated electric energy (Ifc__CAL) calculated by the requested-amount-of-generated-electric-energy calculator 51 were used directly as the target amount of generated electric energy (Ifc__CMD) for the fuel cell control unit 16, then the current charged into the capacitor 3 would suffer a shortage. Therefore, when the total amount of electric energy consumed by the electric motor 10 and the electric accessories is greatly reduced, and the current charged into the capacitor 3 exceeds an amount of generated electric energy depending on the margin of the target amount of reactive gases (CMP__CMD), the fuel cell stack 2 runs short of reactive gases.

While the gas supply control process is being performed, the target selector 53 compares the requested amount of generated electric energy (Ifc__CAL) and the actual amount of generated electric energy (Ifc__s) with each other. If the requested amount of generated electric energy (Ifc__CAL) is equal to or greater than the actual amount of generated electric energy (Ifc__s) (Ifc__CAL≧Ifc__s), then the target selector 53 regards the requested amount of generated electric energy (Ifc__CAL) as the target amount of generated electric energy (Ifc__CMD) for the fuel cell control unit 16 (Ifc__CMD=Ifc__s). If the actual amount of generated electric energy (Ifc__s) is greater than the requested amount of generated electric energy (Ifc__CAL) (Ifc__CAL<Ifc__s), then the target selector 53 regards the actual amount of generated electric energy (Ifc__s) as the target amount of generated electric energy (Ifc__CMD) for the fuel cell control unit 16.

Therefore, when the electric energy consumed by the electric accessories increases quickly, or the capacitor 3 is charged and the actual amount of generated electric energy (Ifc__s) becomes greater than the requested amount of generated electric energy (Ifc__CAL) calculated by the requested-amount-of-generated-electric-energy calculator 51, and the fuel cell stack 2 tends to run short of reactive gases if the requested amount of generated electric energy (Ifc__CAL) is used directly as the target amount of generated electric energy (Ifc__CMD) for the fuel cell control unit 16, the target selector 53 regards the actual amount of generated electric energy (Ifc__s) as the target amount of generated electric energy (Ifc__CMD) for the fuel cell control unit 16.

As a result, in order to perform the gas supply control process based on the actual amount of generated electric energy (Ifc__s), the target-amount-of-supplied-gases calculator 54 determines the target amount of reactive gases (CMP__CMD) to given a margin to the consumed amount of air depending on the actual amount of generated electric energy (Ifc__s). Therefore, the amount of reactive gases supplied from the reactive gas supply device 21 to the fuel cell stack 2 is prevented from suffering a shortage, thus protecting the fuel cell stack 2 from a lack of the reactive gases.

In the illustrated embodiment, the output current of the fuel cell stack 2 is used as the amount of generated electric energy. However, the output electric energy of the fuel cell stack 2 may be used as the amount of generated electric energy. In such a modification, the requested-amount-ofgenerated-electric-energy calculator 51 is not required to convert the electric energy into a current. Instead, an electric energy which is the sum of the motor-requested electric energy (PD_REQ) and the consumed electric energy of the electric accessories which is calculated from the load current (I_load) and the load voltage (V_load) which are detected by the load sensor 15 may be used as a requested amount of generated electric energy, and an electric energy which is calculated by multiplying the output current (Ifc) from the fuel cell sensor 30 by the output voltage (Vfc) from the fuel cell sensor 30 may be used as an actual amount of generated electric energy, and these requested and actual amounts of generated electric energy may be compared with each other.

The fuel cell control unit 16 may convert a target amount of generated electric energy into an output current of the fuel cell stack 2 for thereby determining a target amount of reactive gases (CMP_CMD).

In the illustrated embodiment, the electric double layer capacitor is used as the electric storage means. However, the principles of the present invention are also applicable to capacitors and batteries of other types.

The advantages of the present invention are effective even if the electric storage means is not connected parallel to the fuel cell stack 2.

Although a certain preferred embodiment of the present invention has been shown and described in detail, it should be understood that various changes and modifications may be made therein without departing from the scope of the appended claims.

What is claimed is:

1. A fuel cell power supply device comprising:

a fuel cell;

reactive gas supply means for supplying reactive gases to the fuel cell;

supplied-amount regulating means for regulating an amount of reactive gases supplied from said reactive gas supply means to said fuel cell;

target-amount-of-generated-electric-energy determining means for determining a target amount of electric energy generated by said fuel cell depending on a requested electric energy of a load which is connected to said fuel cell;

gas supply control means for performing a gas supply control process to enable said supplied-amount regulating means to regulate the amount of reactive gases supplied from said reactive gas supply means to said fuel cell in order to supply an amount of reactive gases greater than the amount of reactive gases depending on said target amount of electric energy; and actual-amount-of-electric-energy detecting means for detecting an actual amount of electric energy generated by said fuel cell;

said gas supply control means comprising means for comparing said target amount of electric energy and said actual amount of electric energy with each other, and performing said gas supply control process using said actual amount of electric energy as said target amount of electric energy if actual amount of electric energy is greater than said target amount of electric energy.

2. A fuel cell power supply device according to claim 1, further comprising:

electric storage means connected parallel to said fuel cell, for being charged with an output current from said fuel cell and discharged when the amount of electric energy generated by said fuel cell is smaller than said requested electric energy.

* * * * *